US012249211B2

(12) United States Patent
Frenkel

(10) Patent No.: US 12,249,211 B2
(45) Date of Patent: Mar. 11, 2025

(54) SYSTEMS AND METHODS FOR INTERACTIVE ELECTRONIC GAMING WITH COLLUSION DETECTION

(71) Applicant: AG 18, LLC, Denver, CO (US)

(72) Inventor: Brian Frenkel, Denver, CO (US)

(73) Assignee: AG 18, LLC, Denver, CO (US)

( * ) Notice: Subject to any disclaimer, the term of this patent is extended or adjusted under 35 U.S.C. 154(b) by 0 days.

(21) Appl. No.: 18/649,514

(22) Filed: Apr. 29, 2024

(65) Prior Publication Data

US 2024/0273973 A1 Aug. 15, 2024

Related U.S. Application Data

(63) Continuation of application No. 17/097,290, filed on Nov. 13, 2020, now Pat. No. 11,972,662, which is a (Continued)

(51) Int. Cl.
*G07F 17/32* (2006.01)

(52) U.S. Cl.
CPC .......... *G07F 17/3227* (2013.01); *G07F 17/32* (2013.01); *G07F 17/3209* (2013.01); (Continued)

(58) Field of Classification Search
CPC .. G07F 17/3227; G07F 17/32; G07F 17/3209; G07F 17/3211; G07F 17/3218; (Continued)

(56) References Cited

U.S. PATENT DOCUMENTS 4,685,677 A 8/1987 Demar et al.
4,760,527 A 7/1988 Sidley
(Continued)

FOREIGN PATENT DOCUMENTS

CN 101044520 A 9/2007
JP 2004-65339 A 3/2004
(Continued)

OTHER PUBLICATIONS

Australian Patent Application No. 2022200378, Examination Report, 7 pages, Mar. 28, 2023.
(Continued)

*Primary Examiner* — Pierre E Elisca

(57) ABSTRACT

Systems and methods for interactive electronic gaming with collusion detection. A host computer system may initiate an interactive gaming session for an interactive electronic game. Interactions by players may be received by the host computer system via player terminals to control gaming action of an interactive electronic game. Interactive content displayed to the players may be responsively changed according to a state of the game created by gaming action. In response to the gaming action, the interactions received from the player terminals may be evaluated and an occurrence of gaming rule violations may be determined based on a result of the interactions being evaluated. Upon determining an occurrence of a gaming rule violation, the host computer system may initiate actions to bar involved player(s) from participating in the interactive gaming session using respective player terminal(s).

30 Claims, 6 Drawing Sheets

Related U.S. Application Data continuation of application No. 16/139,766, filed on Sep. 24, 2018, now Pat. No. 10,839,644, which is a continuation of application No. 15/711,554, filed on Sep. 21, 2017, now Pat. No. 10,083,571, which is a continuation of application No. 15/212,578, filed on Jul. 18, 2016, now Pat. No. 9,786,121, which is a continuation of application No. 14/880,001, filed on Oct. 9, 2015, now Pat. No. 9,396,611, which is a continuation of application No. 11/183,247, filed on Jul. 14, 2005, now Pat. No. 9,159,195.

(52) U.S. Cl.
CPC ...... *G07F 17/3211* (2013.01); *G07F 17/3218* (2013.01); *G07F 17/3241* (2013.01); *G07F 17/3246* (2013.01); *G07F 17/3248* (2013.01); *G07F 17/3251* (2013.01); *G07F 17/3255* (2013.01); *G07F 17/3258* (2013.01); *G07F 17/3272* (2013.01); *G07F 17/3276* (2013.01); *G07F 17/3293* (2013.01)

(58) Field of Classification Search
CPC ............. G07F 17/3241; G07F 17/3246; G07F 17/3248; G07F 17/3255; G07F 17/3272; G07F 17/3258; G07F 17/3276; G07F 17/3293
USPC ................................................ 463/11, 12, 13
See application file for complete search history.

(56) References Cited

U.S. PATENT DOCUMENTS

| | | | | |
|---|---|---|---|---|
| 4,926,327 | A | 5/1990 | Sidley | |
| 5,257,179 | A | 10/1993 | DeMar | |
| 5,472,194 | A | 12/1995 | Breeding et al. | |
| 5,755,621 | A | 5/1998 | Marks et al. | |
| 5,762,552 | A | 6/1998 | Vuong et al. | |
| 5,800,268 | A | 9/1998 | Molnick | |
| 5,816,915 | A | 10/1998 | Kadlic | |
| 5,882,260 | A | 3/1999 | Marks et al. | |
| 6,007,426 | A | 12/1999 | Kelly et al. | |
| 6,093,100 | A | 7/2000 | Singer et al. | |
| 6,104,815 | A | 8/2000 | Alcorn et al. | |
| 6,264,561 | B1 | 7/2001 | Saffari et al. | |
| 6,347,086 | B1 | 2/2002 | Strachan | |
| 6,508,709 | B1 | 1/2003 | Karmarkar | |
| 6,676,522 | B2 | 1/2004 | Rowe | |
| 6,679,777 | B2 | 1/2004 | Pfeiffer et al. | |
| 6,764,397 | B1 * | 7/2004 | Robb | A63F 9/24 700/92 |
| 6,767,284 | B1 | 7/2004 | Koza | |
| 6,931,131 | B1 | 8/2005 | Becker, Jr. et al. | |
| 6,964,608 | B1 | 11/2005 | Koza | |
| D512,466 | S | 12/2005 | White et al. | |
| 7,040,987 | B2 | 5/2006 | Walker et al. | |
| 7,100,916 | B2 | 9/2006 | Kelly et al. | |
| 7,306,516 | B2 | 12/2007 | Iosilevsky | |
| 7,367,563 | B2 | 5/2008 | Yoseloff et al. | |
| 7,680,038 | B1 | 3/2010 | Gourlay | |
| 7,699,695 | B2 | 4/2010 | White et al. | |
| 7,699,702 | B2 | 4/2010 | Daniel | |
| 7,758,411 | B2 | 7/2010 | Crawford, III et al. | |
| 7,794,324 | B2 | 9/2010 | White et al. | |
| 7,867,091 | B2 | 1/2011 | Moshal | |
| 7,914,381 | B2 | 3/2011 | Blythe et al. | |
| 8,070,582 | B2 * | 12/2011 | Lutnick | G07F 17/3239 463/16 |
| 8,460,109 | B2 | 6/2013 | Bryson et al. | |
| 8,529,349 | B2 | 9/2013 | Kelly et al. | |
| 8,535,158 | B2 | 9/2013 | Kelly et al. | |
| 8,777,735 | B1 | 7/2014 | Fine et al. | |
| 8,888,578 | B2 | 11/2014 | Kelly et al. | |
| 9,159,195 | B2 | 10/2015 | Frenkel | |
| 9,396,611 | B2 | 7/2016 | Frenkel | |
| 9,589,417 | B2 | 3/2017 | Frenkel et al. | |
| 9,613,498 | B2 | 4/2017 | Koustas et al. | |
| 9,697,682 | B2 | 7/2017 | Frenkel et al. | |
| 9,704,335 | B2 | 7/2017 | Frenkel et al. | |
| 9,786,121 | B2 | 10/2017 | Frenkel | |
| 9,824,533 | B2 | 11/2017 | Frenkel | |
| 9,830,768 | B2 | 11/2017 | Frenkel et al. | |
| 9,875,610 | B2 | 1/2018 | Frenkel et al. | |
| 9,881,449 | B1 | 1/2018 | Frenkel | |
| 9,911,271 | B2 | 3/2018 | Frenkel et al. | |
| 9,940,780 | B2 | 4/2018 | Frenkel et al. | |
| 9,947,176 | B2 | 4/2018 | Frenkel et al. | |
| 9,978,205 | B2 | 5/2018 | Koustas et al. | |
| 10,078,939 | B2 | 9/2018 | Frenkel et al. | |
| 10,083,571 | B2 | 9/2018 | Frenkel | |
| 10,089,823 | B2 | 10/2018 | Frenkel et al. | |
| 10,140,808 | B2 | 11/2018 | Frenkel | |
| 10,140,809 | B2 | 11/2018 | Frenkel | |
| 10,210,705 | B2 | 2/2019 | Frenkel et al. | |
| 10,226,687 | B2 * | 3/2019 | Grauzer | A63F 1/12 |
| 10,275,981 | B2 | 4/2019 | Frenkel et al. | |
| 10,325,449 | B2 | 6/2019 | Frenkel et al. | |
| 10,339,760 | B2 | 7/2019 | Frenkel et al. | |
| 10,497,220 | B2 | 12/2019 | Simons et al. | |
| 10,614,657 | B2 | 4/2020 | Koustas et al. | |
| 10,685,532 | B2 | 6/2020 | Frenkel | |
| 10,692,325 | B2 | 6/2020 | Simons et al. | |
| 10,720,009 | B2 | 7/2020 | Simons et al. | |
| 10,810,837 | B2 | 10/2020 | Frenkel et al. | |
| 10,832,519 | B2 | 11/2020 | Frenkel et al. | |
| 10,839,644 | B2 | 11/2020 | Frenkel | |
| 10,846,983 | B2 | 11/2020 | Frenkel et al. | |
| 10,964,161 | B2 | 3/2021 | Frenkel et al. | |
| 11,024,131 | B2 | 6/2021 | Simons et al. | |
| 11,037,398 | B2 | 6/2021 | Frenkel | |
| 11,055,956 | B2 | 7/2021 | Frenkel et al. | |
| 11,055,957 | B2 | 7/2021 | Frenkel et al. | |
| 11,074,778 | B2 | 7/2021 | Koustas et al. | |
| 11,302,141 | B2 | 4/2022 | Simons et al. | |
| 11,315,385 | B2 | 4/2022 | Frenkel et al. | |
| 11,475,732 | B2 | 10/2022 | Koustas et al. | |
| 11,583,758 | B2 * | 2/2023 | Lutnick | A63F 13/00 |
| 11,875,636 | B2 | 1/2024 | Frenkel | |
| 11,875,638 | B2 | 1/2024 | Frenkel et al. | |
| 11,908,285 | B2 | 2/2024 | Simons et al. | |
| 11,972,662 | B2 | 4/2024 | Frenkel | |
| 2001/0004609 | A1 | 6/2001 | Walker et al. | |
| 2001/0019965 | A1 | 9/2001 | Ochi | |
| 2001/0037211 | A1 | 11/2001 | McNutt et al. | |
| 2001/0044337 | A1 | 11/2001 | Rowe et al. | |
| 2002/0002075 | A1 | 1/2002 | Rowe | |
| 2002/0025851 | A1 | 2/2002 | Frankulin et al. | |
| 2002/0028707 | A1 | 3/2002 | Pascal et al. | |
| 2002/0049975 | A1 | 4/2002 | Thomas et al. | |
| 2002/0066996 | A1 | 6/2002 | Nelson et al. | |
| 2002/0094869 | A1 | 7/2002 | Harkham | |
| 2002/0098884 | A1 | 7/2002 | Adams | |
| 2002/0103028 | A1 | 8/2002 | Carter et al. | |
| 2002/0103029 | A1 | 8/2002 | Finlayson et al. | |
| 2002/0123377 | A1 | 9/2002 | Shulman | |
| 2002/0169015 | A1 | 11/2002 | Moody | |
| 2003/0003997 | A1 | 1/2003 | Vuong et al. | |
| 2003/0032474 | A1 | 2/2003 | Kaminkow | |
| 2003/0064805 | A1 | 4/2003 | Wells | |
| 2003/0109306 | A1 | 6/2003 | Karmarkar | |
| 2003/0125973 | A1 | 7/2003 | Mathews et al. | |
| 2003/0130041 | A1 | 7/2003 | Pascal et al. | |
| 2003/0139190 | A1 | 7/2003 | Steelberg et al. | |
| 2003/0176218 | A1 | 9/2003 | LeMay et al. | |
| 2003/0224854 | A1 | 12/2003 | Joao | |
| 2003/0236120 | A1 | 12/2003 | Reece et al. | |
| 2004/0162124 | A1 | 8/2004 | Barton | |
| 2004/0192431 | A1 | 9/2004 | Singer et al. | |
| 2004/0192442 | A1 | 9/2004 | Wells et al. | |
| 2004/0259626 | A1 | 12/2004 | Akram et al. | |
| 2005/0026696 | A1 | 2/2005 | Hashimoto et al. | |
| 2005/0037842 | A1 | 2/2005 | Kastner | |

(56) References Cited

U.S. PATENT DOCUMENTS

| | | | | |
|---|---|---|---|---|
| 2005/0043094 | A1 | 2/2005 | Nguyen et al. | |
| 2005/0090304 | A1 | 4/2005 | Crawford, III et al. | |
| 2005/0116020 | A1 | 6/2005 | Smolucha et al. | |
| 2005/0130728 | A1 | 6/2005 | Nguyen et al. | |
| 2005/0143169 | A1 | 6/2005 | Nguyen et al. | |
| 2005/0181870 | A1 | 8/2005 | Nguyen et al. | |
| 2005/0187020 | A1 | 8/2005 | Amaitis et al. | |
| 2005/0193209 | A1 | 9/2005 | Saunders et al. | |
| 2005/0215326 | A1 | 9/2005 | Iosilevsky | |
| 2006/0019745 | A1 | 1/2006 | Benbrahim | |
| 2006/0025221 | A1 | 2/2006 | Jain et al. | |
| 2006/0058008 | A1 | 3/2006 | Choksi | |
| 2006/0058088 | A1 | 3/2006 | Crawford et al. | |
| 2006/0068870 | A1 | 3/2006 | Crawford et al. | |
| 2006/0080175 | A1 | 4/2006 | Rowe et al. | |
| 2006/0095790 | A1 | 5/2006 | Nguyen et al. | |
| 2006/0121968 | A1 | 6/2006 | Daniel | |
| 2006/0148560 | A1 | 7/2006 | Arezina et al. | |
| 2006/0189381 | A1 | 8/2006 | Daniel et al. | |
| 2006/0205484 | A1* | 9/2006 | Nicastro | G07F 17/3244 463/25 |
| 2006/0229122 | A1 | 10/2006 | Macke | |
| 2006/0258425 | A1 | 11/2006 | Edidin et al. | |
| 2006/0287103 | A1 | 12/2006 | Crawford et al. | |
| 2007/0015584 | A1 | 1/2007 | Frenkel | |
| 2007/0054739 | A1 | 3/2007 | Amaitis et al. | |
| 2007/0087834 | A1 | 4/2007 | Moser et al. | |
| 2007/0213112 | A1 | 9/2007 | Humphrey et al. | |
| 2007/0259716 | A1 | 11/2007 | Mattice et al. | |
| 2008/0020848 | A1 | 1/2008 | Muir et al. | |
| 2008/0132214 | A1 | 6/2008 | Dupray et al. | |
| 2008/0188309 | A1 | 8/2008 | Moshal | |
| 2008/0274802 | A1 | 11/2008 | Joao | |
| 2009/0062008 | A1 | 3/2009 | Karmarkar | |
| 2009/0093300 | A1* | 4/2009 | Lutnick | G07F 17/3293 463/31 |
| 2009/0203432 | A1 | 8/2009 | Carter, Sr. | |
| 2009/0227362 | A1 | 9/2009 | Kelly et al. | |
| 2009/0270175 | A1 | 10/2009 | Kelly et al. | |
| 2009/0318219 | A1 | 12/2009 | Koustas et al. | |
| 2010/0240431 | A1 | 9/2010 | Hermann et al. | |
| 2012/0046110 | A1 | 2/2012 | Amaitis et al. | |
| 2012/0052939 | A1* | 3/2012 | Lutnick | G07F 17/3262 463/25 |
| 2013/0065669 | A1 | 3/2013 | Michaelson et al. | |
| 2013/0065670 | A1 | 3/2013 | Michaelson et al. | |
| 2014/0221071 | A1 | 8/2014 | Calio et al. | |
| 2014/0378219 | A1 | 12/2014 | Arnone et al. | |
| 2015/0310703 | A1 | 10/2015 | Katz et al. | |
| 2018/0012449 | A1 | 1/2018 | Frenkel | |
| 2018/0151025 | A1 | 5/2018 | Frenkel | |
| 2018/0268644 | A1 | 9/2018 | Cong | |
| 2019/0333030 | A1 | 10/2019 | Ramasamy et al. | |
| 2020/0038761 | A1 | 2/2020 | Packin et al. | |
| 2021/0407251 | A1 | 12/2021 | Frenkel | |
| 2022/0157131 | A1* | 5/2022 | Lutnick | G07F 17/3239 463/9 |

FOREIGN PATENT DOCUMENTS

| | | | |
|---|---|---|---|
| JP | 2008-513110 | A | 5/2008 |
| JP | 2008-546443 | B2 | 12/2008 |
| JP | 5414273 | | 11/2013 |
| JP | 2016-76230 | A | 5/2016 |
| KR | 2001-0050000 | A | 6/2001 |
| KR | 2006-0049774 | A | 5/2006 |
| WO | 2003/093921 | A2 | 11/2003 |
| WO | 2004/071601 | A2 | 8/2004 |
| WO | 2007011715 | A2 | 1/2007 |

OTHER PUBLICATIONS

Australian Patent Application No. 2022200378, Examination Report No. 2, 6 pages, Jul. 6, 2023.

Australian Patent Application No. 2022200378, Examination Report No. 3, 5 pages, Oct. 3, 2023.

Decision Granting Institution of Inter Partes Review for U.S. Pat. No. 10,497,220, *DraftKings Inc.* vs. *AG 18, LLC*, PR2022-01442, 38 pages, Mar. 14, 2023.

Decision Granting Institution of Inter Partes Review for U.S. Pat. No. 11,024,131, *DraftKings Inc.* vs. *AG 18, LLC*, PR2022-01445, 33 pages, Mar. 14, 2023.

Decision Granting Institution of Inter Partes Review for U.S. Pat. No. 9,978,205, *DraftKings Inc.* vs. *AG 18, LLC*, PR2022-01446, 43 pages, Mar. 14, 2023.

Decision Granting Institution of Inter Partes Review for U.S. Pat. No. 9,613,498, *DraftKings Inc.* vs. *AG 18, LLC*, PR2022-01447, 57 pages, Mar. 14, 2023.

Decision Granting Institution of Inter Partes Review for U.S. Pat. No. 10,614,657, *DraftKings Inc.* vs. *AG 18, LLC*, PR2022-01448, 47 pages, Mar. 14, 2023.

International Application No. PCT/US2006/027339, International Search Report & Written Opinion, 6 pages, Jan. 16, 2007.

Japanese Patent Application No. 2018-023693, Office Action, 6 pages, May 29, 2018.

Japanese Patent Application No. 2018-198082, Office Action, 11 pages, Jan. 7, 2020.

Japanese Patent Application No. 2020-013216, Office Action, 6 pages, Jun. 24, 2020.

Japanese Patent Application No. 2020-013216, Office Action, 9 pages, Oct. 20, 2020.

Japanese Patent Application No. 2021-203853, Notice of Allowance, 3 pages, Nov. 28, 2023.

Judgment Final Written Decision for U.S. Pat. No. 10,497,220, *DraftKings Inc.* vs. *AG 18, LLC*, IPR2022-01442, 76 pages, Mar. 12, 2024.

Judgment Final Written Decision for U.S. Pat. No. 11,024,131, *DraftKings I.* vs. *AG 18, LLC*, IPR2022-01445, 73 pages, Mar. 12, 2024.

Judgment Final Written Decision for U.S. Pat. No. 9,978,205, *DraftKings Inc.* vs. *AG 18, LLC*, IPR2022-01446, 102 pages, Mar. 12, 2024.

Judgment Final Written Decision for U.S. Pat. No. 9,613,498, *DraftKings Inc.* vs. *AG 18, LLC*, IPR2022-01447, 92 pages, Mar. 13, 2024.

Judgment Final Written Decision for U.S. Pat. No. 10,614,657, *DraftKings Inc.* vs. *AG 18, LLC*, IPR2022-01448, 111 pages, Mar. 12, 2024.

Korean Patent Application No. 2020-7012392, Office Action, 12 pages, Aug. 26, 2020.

Korean Patent Application No. 2020-7016736, Office Action, 8 pages, Sep. 11, 2020.

Macau Patent Application No. I/1494, Office Action, 12 pages, Nov. 22, 2018.

Patent Owner's Response to Petition to Institute Inter Partes Review for U.S. Pat. No. 10,497,220, *DraftKings Inc.* vs. *AG 18, LLC*, IPR2022-01442, 69 pages, Jun. 7, 2023.

Patent Owner's Response to Petition to Institute Inter Partes Review for U.S. Pat. No. 11,024,131, *DraftKings Inc.* vs. *AG 18, LLC*, IPR2022-01445, 67 pages, Jun. 7, 2023.

Patent Owner's Response to Petition to Institute Inter Partes Review for U.S. Pat. No. 9,978,205, *DraftKings Inc.* vs. *AG 18, LLC*, IPR2022-01446, 72 pages, Jun. 7, 2023.

Patent Owner's Response to Petition to Institute Inter Partes Review for U.S. Pat. No. 9,613,498, *DraftKings Inc.* vs. *AG 18, LLC*, IPR2022-01447, 41 pages, Jun. 7, 2023.

Patent Owner's Response to Petition to Institute Inter Partes Review for U.S. Pat. No. 10,614,657, *DraftKings Inc.* vs. *AG 18, LLC*, IPR2022-01448, 52 pages, Jun. 7, 2023.

Petition for Inter Partes Review of U.S. Pat. No. 10,497,220, *DraftKings Inc.* vs. *AG 18, LLC*, IPR2022-01442, 106 pages, Aug. 22, 2022.

(56) References Cited

OTHER PUBLICATIONS

Petition for Inter Partes Review of U.S. Patent No. 11,024,131, *DraftKings Inc*. vs. *AG 18, LLC*, IPR2022-01445, 94 pages, Aug. 30, 2022.
Petition for Inter Partes Review of U.S. Pat. No. 9,978,205, *DraftKings Inc*. vs. *AG 18, LLC*, IPR2022-01446, 102 pages, Aug. 23, 2022.
Petition for Inter Partes Review of U.S. Pat. No. 9,613,498, *DraftKings Inc*. vs. *AG 18, LLC*, IPR2022-01447, 102 pages, Aug. 23, 2022.
Petition for Inter Partes Review of U.S. Pat. No. 10,614,657, *DraftKings Inc*. vs. *AG 18, LLC*, IPR2022-01448, 98 pages, Aug. 23, 2022.
Reagan, Ronald, "America's Great Economic Miracle," 3 pages, Mar. 1, 1975.
U.S. Appl. No. 17/073,959, filed Oct. 19, 2020, Interactive Gaming Systems With Artificial Intelligence.
U.S. Appl. No. 17/091,898, filed Nov. 6, 2020, Variable Payback Gaming.
U.S. Appl. No. 17/101,730, filed Nov. 23, 2020, Electronic Gaming Systems and Methods.
U.S. Appl. No. 17/212,201, filed Mar. 25, 2021, Mechanisms for Detection of Gambling Rule Violations Including Assisted or Automated Gameplay.
U.S. Appl. No. 17/346,717, filed Jun. 14, 2021, Interactive Gaming in Licensed Locations.
U.S. Appl. No. 17/361,468, filed Jun. 29, 2021, Electronic Gaming Systems and Methods Having Variable Payout.
U.S. Appl. No. 17/728,339, filed Apr. 25, 2022, Computerized Electronic Gaming Methods and Systems.
U.S. Appl. No. 18/407,543, filed Jan. 9, 2024, Systems and Methods for Interactive Electronic Gaming With Rule Violation Detection.
U.S. Appl. No. 18/407,609, filed Jan. 9, 2024, Systems and Methods for Multi-Player Electronic Card Game Play.
U.S. Appl. No. 16/933,249, filed Jul. 20, 2020, Location Based Restrictions on Networked Gaming.
U.S. Appl. No. 17/329,943, filed May 25, 2021, Location Based Restrictions on Networked Gaming.
U.S. Appl. No. 17/715,635, filed Apr. 7, 2022, Play-To-Earn Electronic Gaming Systems and Methods.
U.S. Appl. No. 17/894,707, filed Aug. 24, 2022, Location Based Restrictions on Networked Gaming.
U.S. Appl. No. 18/345,076, filed Jun. 30, 2023, Location Based Restrictions on Networked Gaming.
U.S. Appl. No. 18/442,223, filed Feb. 15, 2024, Location Based Restrictions on Networked Gaming.
Examination Report issued in CA Application No. 3,168,224 mailed Aug. 26, 2024, 6 pages.
BlockGeeks: What is Blockchain Technology: A Step-by-Step Guide for Beginners, pp. 1-18, https://web.archive.org/web/20170103030405/http://blockgeeks.com/guides/what-is-blockchain-technology/ (Year:2017).
U.S. Appl. No. 18/442,223 Non-Final Office Action mailed Aug. 27, 2024, 8 pages.
U.S. Appl. No. 17/715,635 Non-Final Office Action mailed Oct. 10, 2024, 60 pages.

* cited by examiner

SYSTEMS AND METHODS FOR INTERACTIVE ELECTRONIC GAMING WITH COLLUSION DETECTION

CROSS REFERENCE TO RELATED APPLICATION

This application is a continuation of U.S. patent application Ser. No. 17/097,290 entitled "Interactive Gaming Systems With Collusion Detection" filed on Nov. 13, 2020, and issued as U.S. Pat. No. 11,972,662 on Apr. 30, 2024; which is a continuation of U.S. patent application Ser. No. 16/139,766 entitled "Interactive Gaming Systems With Collusion Detection," filed on Sep. 24, 2018, and issued on Nov. 17, 2020, as U.S. Pat. No. 10,839,644; which is a continuation of U.S. patent application Ser. No. 15/711,554 entitled "Interactive Gaming Among A Plurality Of Players Systems And Methods," filed on Sep. 21, 2017, and issued on Sep. 25, 2018, as U.S. Pat. No. 10,083,571; which is a continuation of U.S. patent application Ser. No. 15/212,578 entitled "Interactive Gaming Among A Plurality Of Players Systems And Methods," filed on Jul. 18, 2016, and issued on Oct. 10, 2017, as U.S. Pat. No. 9,786,121; which is a continuation of U.S. patent application Ser. No. 14/880,001 entitled "Interactive Gaming Among A Plurality Of Players Systems And Methods," filed on Oct. 9, 2015, and issued on Jul. 19, 2016, as U.S. Pat. No. 9,396,611; which is a continuation of U.S. patent application Ser. No. 11/183,247 entitled "Interactive Gaming Among A Plurality Of Players Systems And Methods," filed Jul. 14, 2005, and issued on Oct. 13, 2015, as U.S. Pat. No. 9,159,195; the contents of each of which are hereby incorporated by reference herein in their entirety for all purposes.

TECHNICAL FIELD

Various embodiments relate generally to gaming systems. More specifically, embodiments of the invention relate to systems and methods for providing interactive gaming among a plurality of players.

BACKGROUND

The popularity of gambling generally and poker specifically has increased at extraordinary rates. Many casinos are opening or reopening poker rooms and Internet poker sites are popping up regularly. New players are coming to the game daily.

There are, however, several impediments to new players joining the ranks of poker players. First, with respect to Internet poker, the legality of Internet poker has not been tested, despite its ever-increasing popularity. Many people simply do not want to risk the possibility of running afoul of the law. Second, many people are simply not comfortable interacting with off-shore enterprises, which is where Internet poker sites are located to avoid the reach of US laws. In order to play at these sites, players must deposit money, which is not immediately accessible by the player. Many people do not trust off shore sites to hold their money. Third, creating an account at an Internet poker site requires a potential player to divulge personal information that many people simply do not wish to share. No one knows the limits of how the information will be used. Further, some people prefer anonymity, which is simply not possible with known Internet poker sites. Hence, for at least these reasons, many people are not becoming poker players through Internet poker opportunities who otherwise would.

Casino poker tables provide its own impediments to new players. For example, the process of getting on a list to play, getting into a table game, and interacting with the many characters you will find in a poker room often intimidates new players to the point of disinterest.

For at least the foregoing reasons, improved systems and methods are needed for providing interactive gaming opportunities to players.

SUMMARY

Various embodiments provide a system for interactive gaming among a plurality of players. The system includes a host computer system and a plurality of player terminals communicably coupled to the host computer system via a network. The plurality of player terminals are located at a plurality of licensed gaming locations. The plurality of player terminals are configured to engage the plurality of players in a common interactive game operated by the host computer system. The plurality of player terminals include means for dispensing player winnings from the player terminal. The plurality of player terminals include electronic measures for monitoring actions taken by one of the plurality of players to detect collusion among the players prior to generating a payout.

In some embodiments, the interactive game may be poker. The host computer system may be located at a location different from any of the plurality of player terminals. Each player terminal may include means for receiving player deposits. The means for receiving player deposits may include a bill accepter. One or more of the plurality of player terminals may include means for receiving a user input to view hole cards dealt to the user in the course of the interactive game. The hole cards otherwise may not be viewable to anyone but the player at the terminal. The host computer system may include means for monitoring actions taken by one or more of the plurality of players to thereby detect collusion among the players. The host computer system may include means for tracking one or more jackpots payable by an operator of one of the plurality of licensed gaming locations. The at least one of the one or more jackpots may include a high hand jackpot for making a specific hand. The at least one of the plurality of player terminals may include means for displaying at least one of the one or more jackpots payable by an operator of the host computer system. The host computer system may include means for tracking one or more jackpots payable by an operator of the host computer system. At least one of the one or more jackpots may include a bad beat jackpot for having a hand with a value at or above a specific value beaten by a hand with a value at or above a different specific value. At least one of the plurality of player terminals may include means for displaying at least one of the one or more jackpots payable by an operator of the host computer system. The host computer system may include means for tracking a player's play to thereby reward the player for player loyalty. The player terminals at a given location may be arranged to thereby inhibit collusion among players using the player terminals at the given location while engaged in a common game.

In other embodiments, a system for interactive gaming among a plurality of players includes a host computer system and a plurality of player terminals communicably coupled to the host computer system via a network. The plurality of player terminals are located at a plurality of licensed gaming locations. The plurality of player terminals are configured to anonymously engage the plurality of players in a common interactive game operated by the host computer system.

In other embodiments, a player terminal includes a processor, an accepter to receive a monetary value from a player, a communications component to connect the player terminal to a host computer system that administers an interactive game between a plurality of players, a display to depict action from an interactive gaming session directed to one of the interactive games operated by the host computer system; and a memory having instructions stored thereon. The memory when executed by the processor cause the player terminal to: generate, in response to receiving the physical monetary value, a credit; monitor, during the course of the interactive gaming session, a player interaction area for a bet having a betting value; deduct, upon detecting the bet, the betting value from the credit associated with the player terminal; employ electronic collusion avoidance measures to review actions taken by one of the plurality of players to detect collusion among the plurality of players; monitor the player interaction area for an indication that the player would like to leave the interactive gaming session; and transmit, in response to detecting the indication that the player would like to leave the interactive gaming session, a signal to the host computer system that the player has left the interactive gaming session.

In some embodiments, a player terminal includes means for initiating a game session for a plurality of players, means for joining the plurality of players to the game session, means for receiving value from a player, means for generating a credit in exchange for value received, means for receiving bets from the player having a betting value, means for deducting, upon detecting the bet, the betting value from the credit, means for sending signals relating to a current state of the interactive game to the player terminal, means for receiving signals from the player terminals when the players acting in turn during the course of the interactive game, the signals indicating player actions in the game, means for updating the current state of the game with each of the player's action, means for awarding a value to a winning player by updating the credit balance at the conclusion of the game, means for generating a payout, upon detection of an actuation of a cash out button on one of the player terminals, in accordance with the credit balance associated with the player of the player terminal where the cash out button was actuated; and means for monitoring, using electronic measures, actions taken by one of the plurality of players to detect collusion among the players prior to generating a payout.

Some embodiments provide a gaming table for allowing multiple players to play an interactive game. The gaming table can include a processor, a touchscreen, and a memory. The touchscreen display can be configured to depict action from an interactive gaming session directed to the interactive game. The memory can have instructions stored thereon that when executed by the processor cause the gaming table to monitor, during a course of the interactive gaming session, a player interaction area associated with each of the multiple players for an indication of a bet having a betting value. The instructions when executed by the processor may also cause the gaming table to deduct, upon detecting the bet, the betting value from a credit associated with a corresponding player of the player interaction area. In some embodiments, the instructions may cause the gaming table to employ electronic collusion avoidance measures to detect collusion by review of player betting and interactions received via the player interaction area in response to the gaming action and review a frequency of common play between two or more of the multiple players over a period of time and award credits to one or more of the multiple players.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
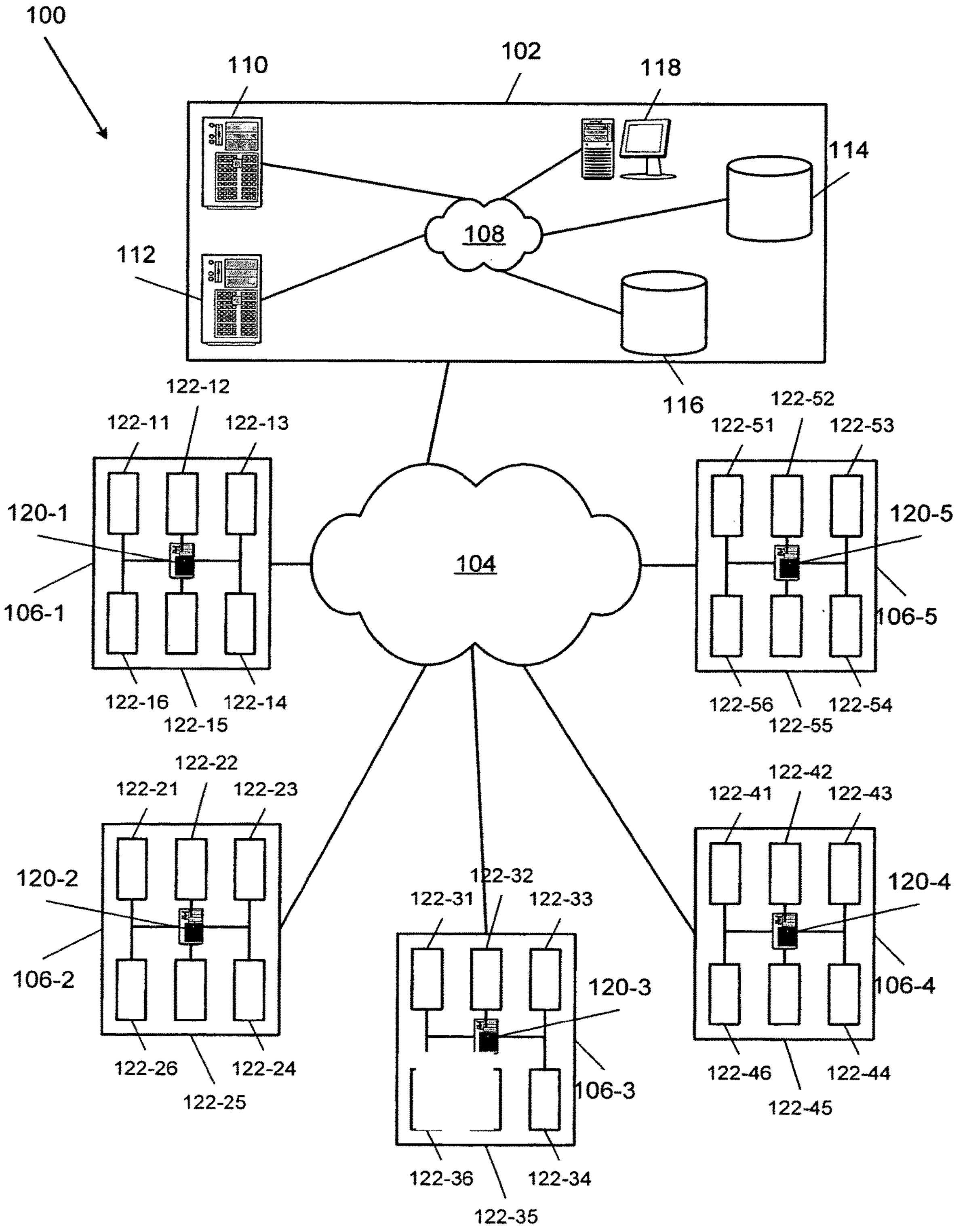
FIG. 1 illustrates an exemplary interactive gaming system according to embodiments of the invention.

Embodiments of the present invention provide networked, interactive gaming. According to embodiments of the invention, players may engage in interactive games such as poker, blackjack, and the like, via a network. "Networked" gaming allows players to participate from different locations, although in some embodiments, players may play from a common location via a local network. The game, however, is typically administered by a processor separate from a player's terminal. By allowing participation from a large number of locations simultaneously, the quality and variety of the gaming opportunity is enhanced through increased demand. "Interactive games," unlike, for example, slots, require at least one player decision after the game has begun. With respect to poker, for example, a player must decide whether to bet, raise, call, or fold after having seen his cards and the action of other players. With respect to blackjack, a player must decide whether to hit, stand, split, double down, or surrender after having seen his cards and the dealer's up card. Other games have similar actions during the progress of the game, which contrasts with slot machines in which players merely decide to initiate a game, after which no player decision is made until the conclusion of the game. In other words, no intermediate decisions are made in noninteractive games.

Embodiments of the invention also provide players the opportunity to participate in networked gaming anonymously. Unlike, for example, Internet poker, in which a player must disclose at least some personal information to create a player account, embodiments of the present invention allow players to enter a game without disclosing any personal information. While some embodiments provide loyalty programs to encourage longer sessions, return customers, and the like, players are not required to participate in loyalty programs. Players may simply deposit funds into a player terminal and enter a game. Hence, no disclosure of personal information is required to participate in games according to embodiments of the present invention.

Further, according to embodiments of the present invention, player terminals are located at licensed gaming locations. This also contrasts with Internet poker and the like, wherein player terminals (e.g., personal computers) may be located anywhere. Hence, according to embodiments of the invention, a player may engage in these games without fear of running afoul of gambling laws. While locations may include casinos, restaurants, bars, race tracks, hotels (including individual hotel rooms), and the like, players are secure in the fact that the location is authorized to provide the gaming opportunity.

Further still, in some embodiments, efforts are made to protect players from unsavory activities that have prevented the emergence of such gaming opportunities heretofore. For example, collusion and other forms of cheating are addressed through player terminal placement, privacy features, electronic monitoring, and/or the like. Hence, players are provided an enhanced gaming opportunity, even with respect to "live" games in which cheating is often hard to detect, since a casino does not see every player's hole cards, players are able to "mark" cards since the cards are physically handled, and colluding players can use sophisticated forms of signaling that go unnoticed by the dealer, floor personnel, or the "eye in the sky."

Players also may compete for enhanced prizes over and above the current "pot." For example, in poker, players may be given bonus jackpots for hitting a certain, usually rare, hand (e.g., a Royal Flush). Also, players may receive a "consolation prize" in the form of a "bad beat" jackpot (e.g., having an aces full house beaten by four of a kind or better). These jackpots may be progressive and could grow to be much more valuable than the contested pot. In blackjack, players can receive bonuses for hitting, for example, an ace and jack of spades blackjack. These and other features and enhancements will be described more fully in the ensuing detailed description.

Attention is directed to FIG. 1, which illustrates an exemplary gaming network 100 according to embodiments of the invention. The gaming network 100 includes a host computer system 102 and a communications network 104 through which a plurality of gaming locations 106 communicate with the host computer system. It should be appreciated that the gaming network 100 is merely exemplary of a number of possible gaming network configurations according to embodiments of the present invention. Further, although the ensuing description will relate to a poker gaming network, this is not a requirement. Embodiments of the present invention may relate to many other types and varieties of games.

This exemplary host computer system 102 includes an internal network 108, a web server 110, a game server 112, a game storage arrangement 114, a player storage arrangement 116, and an administrator computing device 118. In this specific embodiment, the various components of the host computer system 102 are co-located; in other embodiments, the components may be distributed geographically. As those skilled in the art will appreciate, other exemplary host computer systems according to embodiments of the invention may include different components than those illustrated and described herein.

Each gaming location 106 may include a local server 120 and one or more player terminals 122. In some embodiments, the local server 120 may simply facilitate communication between the player terminals 122 and the host computer system 102. In other embodiments, the local server 120 administers the games, tracks players for loyalty purposes, manages player deposits, and/or the like.

The various servers, networks, computing devices, and storage arrangements may be any of a variety of well-known devices. For example, in some embodiments, the communication network 104 is the Internet, the servers 110, 112, 120 are standard products offered, for example, by Dell Corp., the storage arrangements 114, 116 are typical optical, magnetic, solid state, or similar mass storage devices, and the administrator computing device 118 is a typical desktop computer. The player terminals 122 will be described in greater detail below.

According to embodiments of the invention, the gaming locations 106 are licensed gaming locations such as casinos, race tracks, or the like. In some embodiments, the gaming locations 106 are gas stations, hotels, stores, airports, or other locations at which gaming is legal. The gaming locations 106 specifically exclude residences or other locations where gaming is not legal.

It is important to note that the gaming locations need not be attended. Players are able to enter and exit games, deposit and receive money, interact with the player's terminal, and the like, without the assistance of an attendant at the gaming location.

The player terminals 122 at the gaming locations 106 may be in wired or wireless communication with the local server 120. It should be appreciated that the terminals may be wirelessly connected directly to the host computer system 102 via the communications network 104. Other examples are possible. In some embodiments, hotel guests at casino/hotels may "check out" player terminals 122 and engage in gaming from their hotel rooms. In other embodiments, player terminals are in every room in a hotel and players may engage in gaming using the terminals without ever leaving their rooms.

As will be described in greater detail below, in some embodiments players can anonymously engage in games via the gaming network 100. That is, a player may insert cash into a terminal, select a game, and begin playing without creating a user account. This is a significant difference between embodiments of the present invention and previously-known gaming networks such as Internet poker in which players must create user accounts.

As will be described in greater detail hereinafter, players may engage in interactive games from any location. For example, players at terminal 122-21 and 122-25 from gaming location 106-2 may be involved in the same poker game as players using terminals 122-53 and 122-56 from the gaming location 106-5. The host computer system 102 administers the game, distributing information about the action of the game to appropriate player terminals. Cards are dealt to players in the game, although players are only able to view their own cards and any community cards. Betting proceeds from one player to the next, and the host computer system 102 informs each player of the action prior to his turn.

Of course, all players in a particular game may be playing from the same location. The players may be playing next to one another at a common bank of machines or they may be distributed throughout the gaming location (e.g., some in their hotel rooms, some on one floor of a casino, and the reminder on another floor of the casino). Many examples are possible.

It is important to note, however, that gaming locations and the gaming network operator may take special steps to ensure players are not the victim of collusion or other forms of cheating. For example, if two players playing from the same location are within eye sight of each other's terminals, then they may be able to see each other's hole cards or signal each other their holding. This form of collusion provides these players with a significant advantage over other players in the game. Similarly, an individual player may be the innocent victim of another player who can see his hole cards without his knowledge. Hence, the gaming location may employ any of a number of measures to prevent such cheating.

In some embodiments, when a player enters a game from a specific terminal at a gaming location, other terminals within proximity (e.g., three rows of machines, 100 feet, the same floor of the casino, etc.) of the player's terminal may be locked out of the game the player entered. Of course, nothing would prevent two players seated at terminals next to one another from playing in different games. Similarly, wireless terminals may have features that allow them to know when they are in proximity of one another and perform similar lockouts.

With respect to an individual player who has another player looking over his shoulder to see his hole cards, player terminals may have a "hole card reveal" button or the like that allows players to quickly view their hole cards, whereas the cards are otherwise "face down" on the terminal display. While not a guarantee that other players cannot see his cards, a player using such a feature is better able to protect his hand. Shielding on the terminal and/or smaller displays or other features may be used to enhance a player's ability to protect his hand.

Despite all efforts to minimize cheating through visual means, players may nevertheless collude by talking to one another via cell phones or the like. Such collusion may be dealt with in any of a variety of ways. For example, player terminals or the gaming location in general may employ electronic countermeasures that disrupt cell phone signals. More likely, however, the gaming network operator may employ collusion detection software that monitors player action. Since the host computer system 102 knows all players' cards, unusual action by a player may trigger a flag, after which the player's action is given higher scrutiny. Players suspected of colluding may be immediately barred from a game and their deposits held pending resolution.

Figure 2:
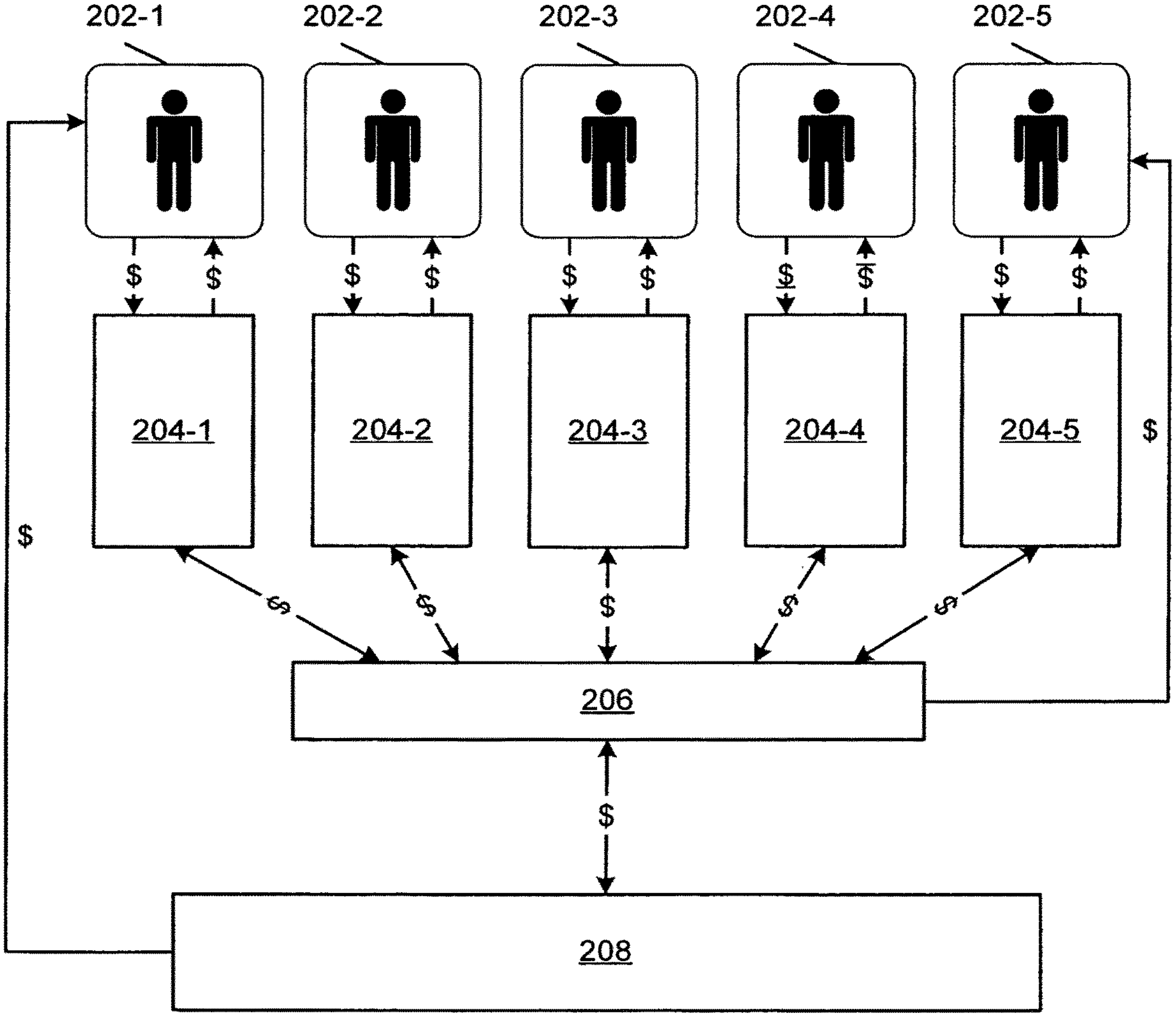
FIG. 2 illustrates graphically one example of how funds flow in an interactive gaming system, such as the system of FIG. 1, according to embodiments of the invention.

Having generally described a gaming network 100 according to embodiments of the invention, attention is directed to FIG. 2, which provides greater detail relating to the flow of funds in such a network. According to this example, players 202 engage in gaming using player terminals 204. The players 202 may insert value (e.g., cash, points, credits, etc.) into the terminals 204 to thereby engage in the games offered by the terminal. When a player 202-1 is ready to cash out of a game, the terminal 204-1 is configured to dispense value back to the player 202.

Excess value travels from the player terminals 204 to a local depository 206 and/or vice versa. In some cases, the value moves electronically, for example, if the value is measured in points or credits. In others cases, e.g., if the value is in the form of paper currency and/or coin, value is physically moved from the local depository 206 to the player terminals 204 ("terminal fills") and vice versa. Occasionally, player cash outs are handled from the local depository 206 directly to the player. In one such example, a player 202-5 is due a higher cash out than the terminal 204-5 can provide. The player 202-5 may have experienced an exceptional winning session, the gaming location may require the player 202-5 to complete tax forms for IRS reporting, the player 202-5 may have won a specialty jackpot that is paid from the local depository 206, the player terminal 204-5 may be configured to only print "tickets" which players 202 redeem for cash at a cashier's cage, and/or the like. Many such examples exist.

In some examples, value is paid from a local depository 206 to a central depository 208 and vice versa. As in the immediately-previous discussion, the central depository 208 may occasionally pay value directly to a player 202-1.

In a specific embodiment, the local depository 206 is a licensed gaming location and the central depository 208 is the operator of the gaming network 100. The operator enlists the gaming location to house terminals in return for a portion of the revenue generated by the network. The compensation to the gaming location may be in proportion to the revenues generated at the gaming location. For example, if the gaming network operator provides interactive poker, each contested pot may be "raked" a certain percentage (e.g., 3% to a maximum of$4). Hence, the winning player's pot may be light a $4 rake. The gaming locations from which the players are engaged in the game may keep $2 of the $4, while the remainder is remitted to the operator. Because players may engage in the same poker game from different locations, occasional revenue balancing may be required to compensate gaming locations at which players have winnings in excess of deposits. Likewise, locations at which players lose more over a period of time provide the excess to the operator for distribution to the locations with the higher wins.

Individual gaming locations and/or the operator of the gaming network may offer promotions to increase player interest. For example, as will be described in greater detail hereinafter, gaming locations may offer "high hand" jackpots. Such jackpots are paid to players for making particular high hands such as four aces, a royal flush, or the like. The jackpot may be reset to a starting value (e.g., $100 for four aces) and increase in proportion to revenues at the gaming locations until the high hand is again hit. Different gaming locations may have different high hand jackpot amounts. In fact, the high hand may be game specific, i.e., there may be one high hand jackpot for four aces in all Texas Hold'em games and a different four aces high hand jackpot for 7-card Stud games. Jackpots also maybe specific to various game limits. High hand jackpots may be paid to players directly from the local depository 206.

The gaming network operator also may offer specialty jackpots, such as "bad beat" jackpots, in which players who have a high value hand beaten may share (e.g., four-of-a-kind beaten by a higher hand). As with the high hand jackpots, bad beat jackpots may reset to a nominal value after being hit and increase as a function of revenue. The revenue base for a bad beat jackpot offered by the gaming network operator may be substantially larger than the revenue base for locally-offered high hand jackpots, in which case the bad beat jackpot may grow at a faster rate. As with the high hand jackpots, bad beat jackpots may be game and limit specific.

Of course, the preceding discussion should not be understood to limit bad beat jackpots to being offered by the gaming network operator or high hand jackpots to being offered by the local gaming location. Further, other types and varieties of jackpots may be offered at any level of the network.

Figure 3:
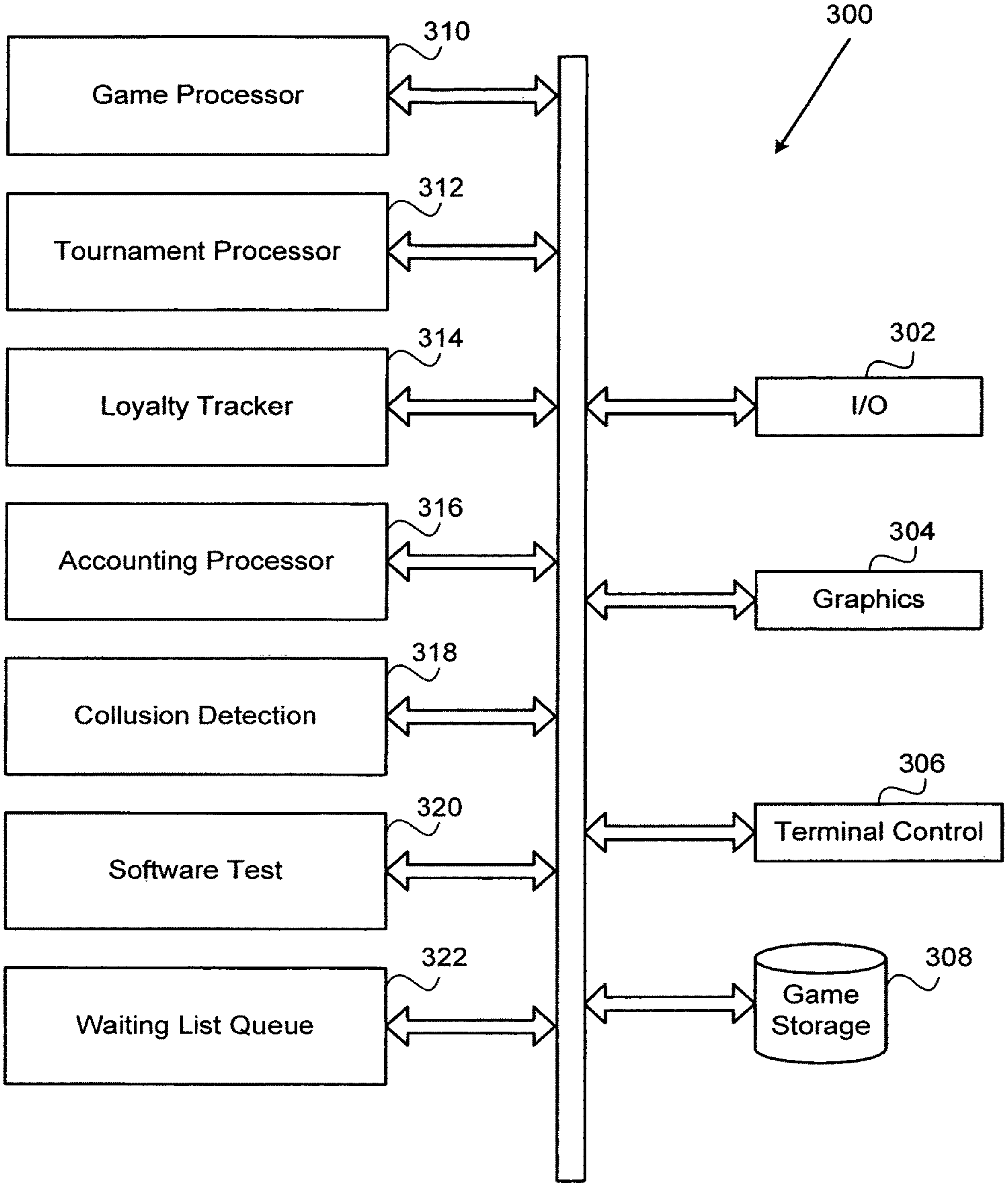
FIG. 3 illustrates an exemplary processing environment for an interactive gaming system according to embodiments of the invention.

Attention is directed to FIG. 3, which illustrates an exemplary functional diagram 300 of the host computer system 102. The functional diagram 300 depicts several program modules as well as basic computer functions. For example, the I/O module 302 handles input to and output from a processing environment and/or the communications network 104. The graphics module 304 provides control over the graphics displayed on player terminals and/or administrative computers. The terminal control module 306 provides the capability of the host computer system 102 to interact with and/or control a player terminal. The game storage arrangement 308 houses software or other computer-executable code that controls the games offered.

A number of processing environments are also included in some embodiments. For example, a game processor 310 controls one or more interactive games using the computer executable code from the game storage arrangement 308. A tournament processor 312 performs a similar function for player tournaments. A loyalty tracker 314 keeps up with the play of registered players to thereby reward players for the amount of time they spend playing. An accounting processor 316 controls the flow of money and/or other forms of value within the network. A collusion detection processor 318 monitors such things as unusual action taken by a specific player, frequent occurrences of the same players playing together in the same games, and the like. A software test environment 320 allows new games and/or processes to be tested in an environment that does not affect ongoing operations. A waiting list queue 322 allows players to wait in line for a specific game or table.

Those skilled in the art will appreciate that this is but one of many possible exemplary functional diagrams for a gaming network according to embodiments of the invention.

Figure 4A:
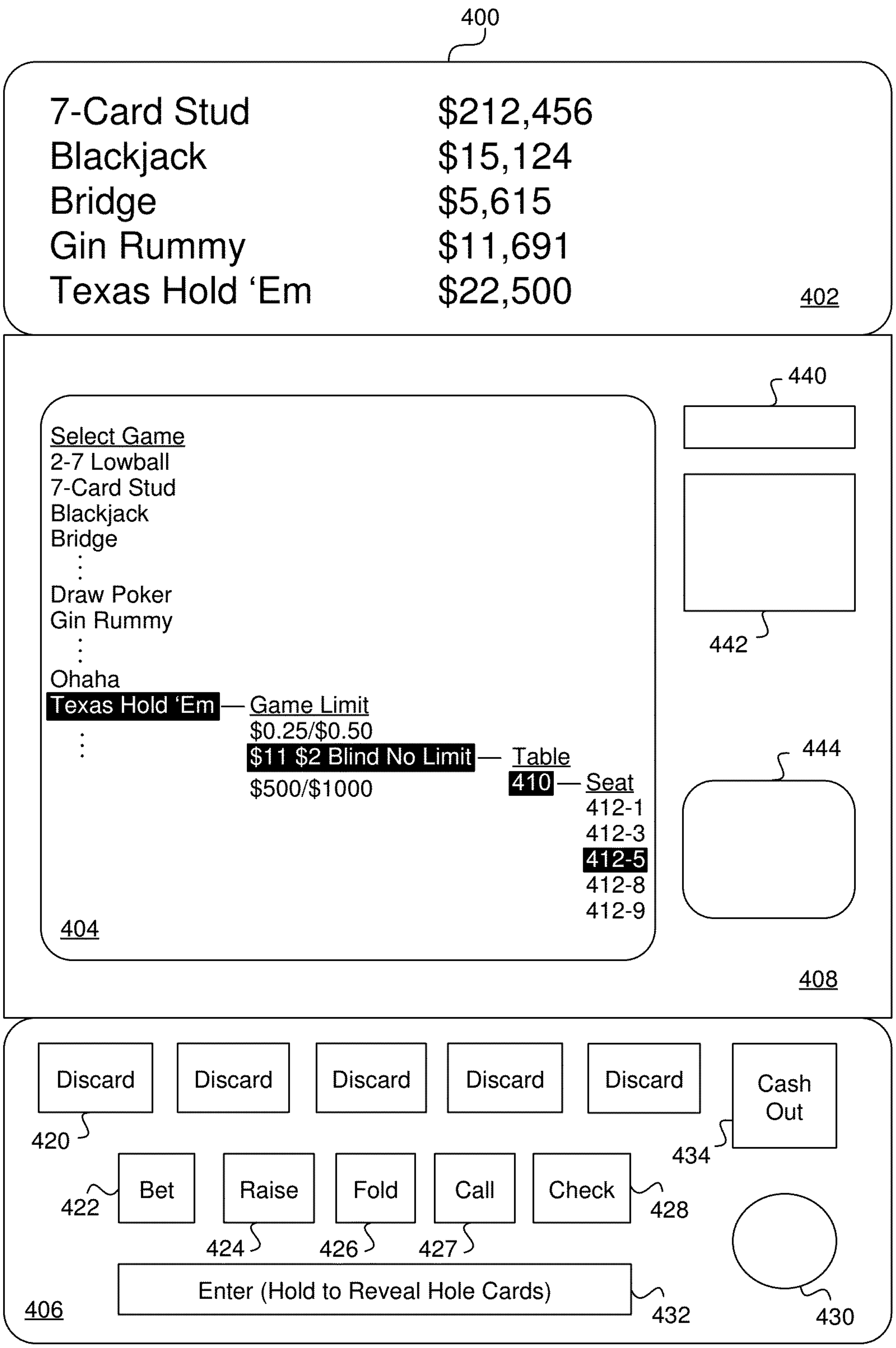
FIGS. 4A-4B illustrate an exemplary player terminal according to embodiments of the invention.
Figure 4B:
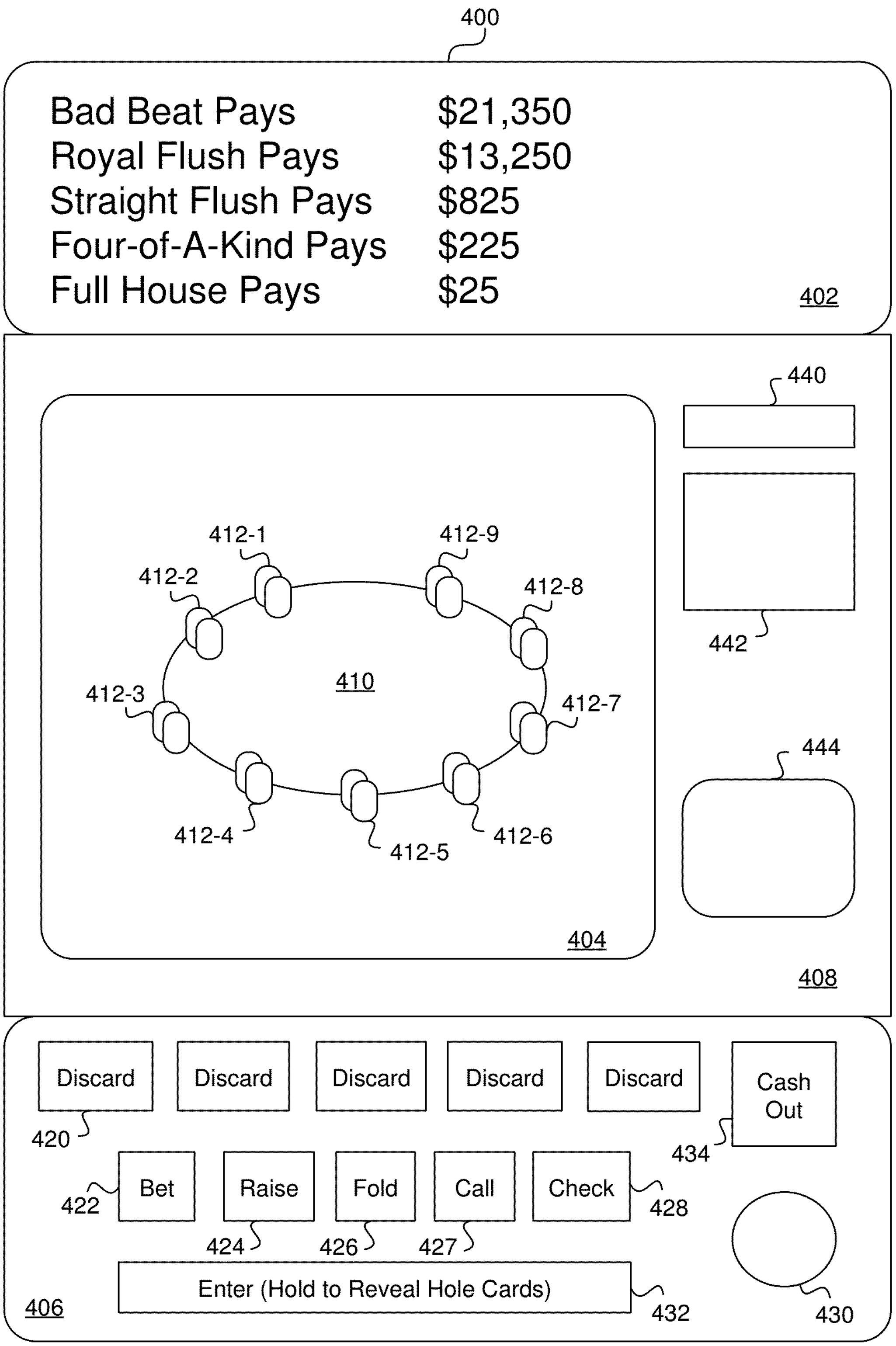

FIGS. 4A-4B illustrate an exemplary player terminal 400 according to embodiments of the invention. Only the most relevant aspects of the user interface portion of the player terminal 400 are illustrated and described here. It should be apparent that the user interface may be part of a hand-held player terminal, a free standing player terminal, a computing device configured as a player terminal, a "set-top" gaming console, and/or the like. Further, it is not necessary for all elements of the player terminal illustrated and described here to be included in the player terminal.

The terminal includes a jackpot payout information area 402, a game display area 404, a player interaction area 406, and a cash and credit interaction area 408. The jackpot payout information area 402 includes information about the status of jackpot accumulations. The amounts associated with the various jackpots may increase with time and may be game specific. For example, if the player terminal provides the possibility to engage in different types of games and limits, then the jackpot amounts displayed in the jackpot information area may change with different player game selections.

The game display area 404 provides a visual depiction of the game in which the player is involved. For example, the game display area 404 may show a poker table 410 and players 412 sitting around the table. As players are dealt cards, the cards may appear in front of each player. As players bet, chips may be displayed in front of the players. At the end of each betting round, the chips from the round may be scooped into the middle of the table to symbolize the pot for which the players are competing. As the action proceeds around the table, the next player to act may be highlighted and that player's terminal may beep, or otherwise alert the player that it is his turn to act. Community cards may appear on the table for all players to see. At the conclusion of the hand, the pot may be pushed to the winning player as the hole cards of all players still in the hand are revealed. Each player's present bankroll may be graphically or numerically displayed so that all players know how much each player has available to wager.

The game display area 404 may be where players look to view their hole cards. A player's hole cards may be continuously displayed. In some embodiments, however, steps are taken to help ensure a player's hole cards remain hidden from other players potentially playing at nearby terminals to thereby prevent cheating. In some embodiments, a button is included (e.g., the enter button 432) that causes the hole cards to be revealed. If the button is not depressed, then the hold cards are simply shown as face down. This way, players can quickly glance at their cards thereby reducing the risk that someone else can view their hole cards. In other embodiments, hole cards may be displayed on a separate display screen. In either case, shielding, glass coatings, polarization screens, and/or the like may be employed to prevent others from viewing a player's hole cards.

The player interaction area 406 includes player buttons, input devices, and the like through which players interact with the game. It should be appreciated that the player interaction area 406 may comprise touch screen buttons on the game display area 404. Hence, it should be understood that this embodiment is merely exemplary of a number of possible embodiments as will be appreciated by those skilled in the art.

The player interaction area 406 in this embodiment includes discard buttons 420 for draw games (e.g., 5-card draw, 2-7 triple draw lowball, etc.). Players use these buttons to identify cards to be discarded in a drawing round. The player interaction area 406 also includes a bet button 422, a raise button 424, a fold button 426, a call button 427, and a check button 428. These buttons are used to take the appropriate action according to each button's name. In some embodiments, additional input buttons and devices are included. For example a track ball 430 may be included for indicating how much a player wants to bet in unstructured games. It also may be used to select from several choices displayed on the display screen 404. It may be used in combination with the enter button 432 to confirm a selection. A cash out button 434 allows a player to leave a game with the value the player has presently accumulated. Those skilled in the art will appreciate many other possibilities in light of this disclosure.

The cash and credit interaction area 408 provides a loyalty card accepter 440, a bill or ticket accepter/dispenser 442, and a coin dispenser 444. These items work in ways similar to analogous devices on, for example, video poker machines, except that the player terminal sends signals to the host computer system in response to player actions taken with respect to cashing in and out.

Those skilled in the art will appreciate that the foregoing description is merely exemplary of a number of possible player terminal embodiments. For example, other embodiments may include all touch screen controls, may only accept bills and dispense tickets, may not include jackpot values, and the like. Most embodiments, however, minimally include a display area through which the action is depicted and which may include player input buttons that change depending on the state of the game. It should also be appreciated that the display region may show display screens that allow players to select games and limits, enter personal information, if desired, and advertise promotions and the like when the terminal is not in use. Many other possibilities exist and are apparent to those skilled in the art in light of this disclosure.

Figure 5:
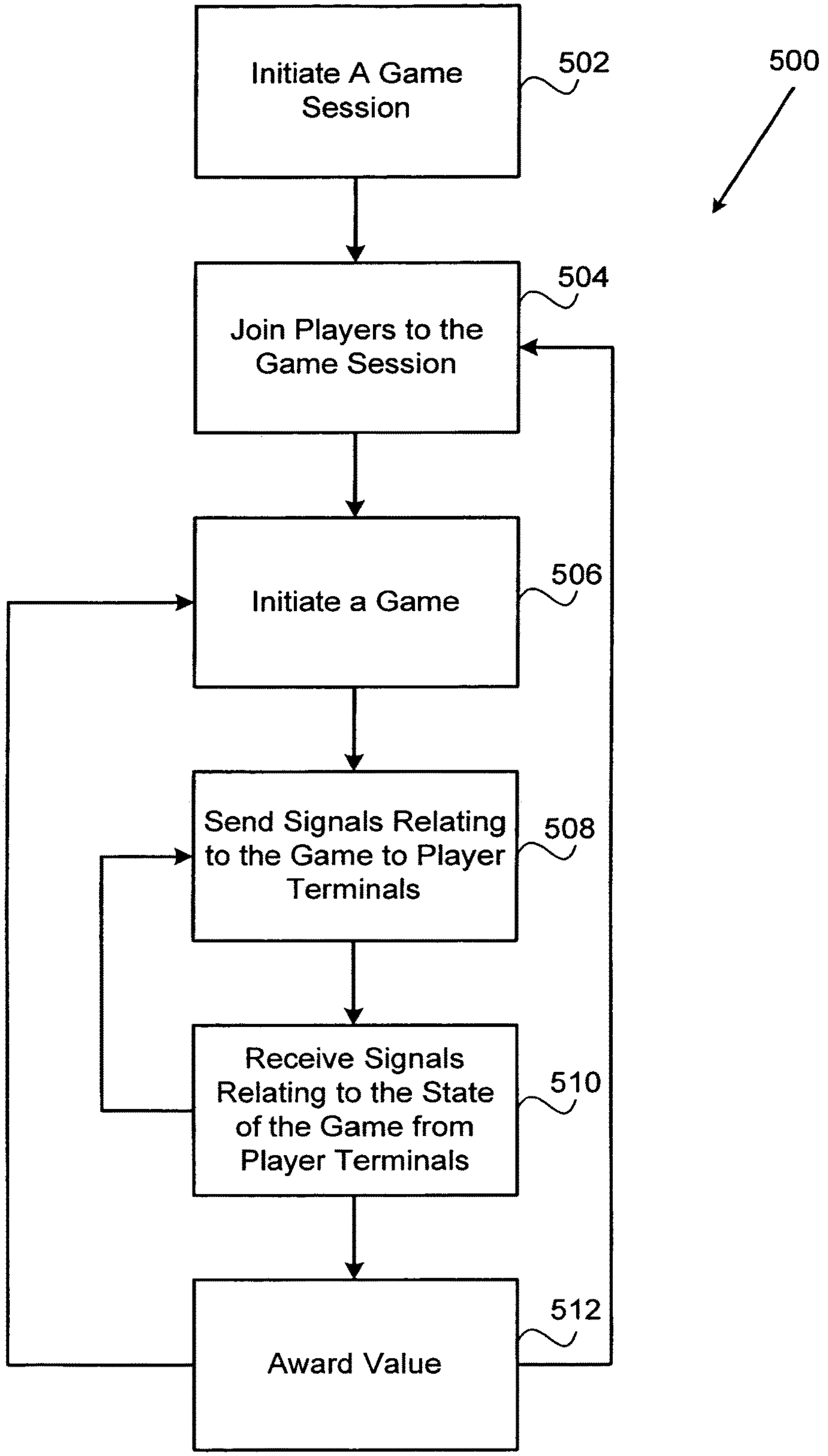
FIG. 5 illustrates an exemplary method according to embodiments of the invention.

An exemplary method 500 according to embodiments of the invention is illustrated in FIG. 5. The method may be implemented in the system 100 of FIG. 1 or other appropriate system. Those skilled in the art will appreciate that other exemplary embodiments may include more, fewer, or different steps than those illustrated and described here. Further, other exemplary embodiments may traverse the steps in different orders than shown here.

The method 500 begins at block 502 at which a host computer system, such as the host computer system 102, initiates a game session. A game session, is, for example, a poker game among several players. The game session consists of one or more hands of poker in which players compete against one another for the pot. The game session could be a series of blackjack hands in which one or more players compete against the house as is known in the art. The game session also could be a series of hands of other games such as gin rummy, bridge, and the like.

In some embodiments, initiating a game session comprises making a selection available on one or more player terminals. The selection allows players at the player terminals to enter the game session. Any number of game sessions could be available at any given time for players to enter. The games may comprise a variety of games (Texas Hold'em, 7-Card Stud, Omaha, Draw poker, 2-7 lowball, Blackjack, Bridge, etc.) and a variety of limits ($0.25/$0.50, $11$2, $11$2 Blind No Limit, $10/$20, $500/$1000, etc.). In some embodiments the game session is a tournament, which may be a single-table tournament or a multi-table tournament.

At block 504, players are joined to the game session. This may comprise receiving a signal from a player terminal that the player desired to enter the game and has deposited sufficient funds to enter the game. The player is assigned to a seat (or is allowed to select a seat) at a virtual table, which may be displayed as shown in FIG. 4B. The player's bankroll (i.e., the player's stake in the game) may be depicted at the virtual table.

In some embodiments, players may be provided with an option to change their perspective of the virtual table. For example, a player may desire to "sit" at the bottom of the table in the seat identified as 412-5 in FIG. 4B. If the player is seated in a different seat, the player may elect to "rotate" the perspective of the table so that the player is depicted in the desired position. This does not change the player's position at the table with respect to the other players; it merely changes the player's perspective for display purposes. This option may be useful in reducing cheating, since the player may relocate his position at the table to a position that obstructs the view of a potential cheater located near the player's terminal. Of course, a player may elect to take a different seat at the table in some embodiments.

In some embodiments, players are randomly assigned to a game session. While a player may identify the game and limit the player wants to play, the table to which the player is assigned is not up to the player. This minimizes the chance that a group of colluding players are able to sit at the same table. Of course, a player can always request a table change or leave the game entirely.

In some embodiments, players enter a waiting list for certain games and limits. If, for example, all the seats at a desired table are taken, a player may request to be placed on a list for that game. Players may enter waiting lists for specific games and/or limits. When a seat opens in a game session that corresponds to the list in which a player is waiting at the top of the list, the player is given the opportunity to enter the game session.

As described previously, collusion or other forms of cheating may be addressed by prohibiting players from engaging in the same game session from locations proximate one another. For example, if a casino has a plurality of player terminals distributed throughout the casino, then players may be prevented from joining the same game session from neighboring terminals. After a player joins a game session from a specific terminal, nearby terminals are "locked out" of that game session. The same process may be followed at all locations. If players are playing from wireless terminals, the wireless terminals may have proximity detection features that perform a similar function of locking out nearby terminals. Many other possibilities exist.

Once a sufficient number of players are joined to a game session, a game, or hand, is initiated at block 506. If, for example, the game is Texas Hold'em Poker, two cards are dealt to each player in the hand.

At block 508, the game proceeds as is known in the art, with the host computer system sending signals to each player terminal indicating the state of the game. The player terminals provide a visual representation of the game state, and a player whose turn it is to act is provided with a set of options. Hence, play continues at block 510 with the host computer system receiving signals indicating a player's action. The actions of blocks 508 and 510 continue with players interactively checking, betting, raising, calling, or folding and the host computer system updating the state of the game by sending signals to the player terminals. If the game limits are fixed, players merely need to indicate their selection for the action to proceed. If, however, the game is "no limit," "pot limit," or another non-structured betting limit, then players also indicate the size of each bet.

At block 512, a winner is determined and the value of the pot is awarded to the winning player. A new game may then be initiated at block 506. Since players are able to enter and leave game sessions at any time, new players may be joined at block 504 to replace any players that leave the game session. While the foregoing description focused on poker being played in the game session, those skilled in the art will appreciate that other forms of poker and other interactive games may be played according to other embodiments of the invention.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention, which is defined in the following claims.

What is claimed is:

1. A system for interactive electronic gaming, the system comprising:
- a communications interface; and
- a host computer operably coupled to the communications interface, and including one or more processors configured to:
  - initiate an interactive gaming session for an interactive electronic game;
  - cause action from the interactive electronic game to be displayed, via the communications interface, on:
    - a display device of a first player terminal operable by a first player; and
    - at least one other display device of at least a second player terminal operable by at least one other player;

monitor, via the communications interface:

a player interaction area of the first player terminal for interactions from the first player to control gaming action of the interactive electronic game; and a player interaction area of the at least a second player terminal for interactions from the at least one other player to control gaming action of the interactive electronic game;

cause, via the communications interface and during the interactive game, interactive content displayed in the player interaction areas of the first, and the at least a second, player terminals to be changed based on a state of the interactive electronic game created by the gaming action;

in response to the gaming action:

evaluate the interactions received via the player interaction areas of the first, and the at least a second, player terminals in view of one or more gaming rules for the interactive gaming session;

determine an occurrence of a violation of the one or more gaming rules by the one or both of the first player and the at least one other player based on a result of the interactions being evaluated; and in response to the occurrence of the violation being determined, cause, via the communications interface, one or both of the first player and the at least one other player to be barred from participating in the interactive gaming session using a respective player terminal of at least one of the first, and the at least a second, player terminals.

2. The system of claim 1, wherein to evaluate the actions, the one or more processors are further configured to evaluate a frequency of common play between the first, and the at least one other, players in the interactive electronic game in view of the one or more gaming rules for the interactive gaming session.

3. The system of claim 1, wherein the one or more gaming rules include one or more gambling rules for the interactive gaming session, and wherein the one or more processors are further configured to monitor the player interaction areas of the first, and the at least a second, player terminals for a bet having a value.

4. The system of claim 3, wherein to evaluate the actions, the one or more processors are further configured to evaluate bets received via the player interaction areas of the first, and the at least a second, player terminals in view of the one or more gambling rules for the interactive gaming session.

5. The system of claim 4, wherein to determine the occurrence of the violation, the one or more processors are further configured to determine, based on the evaluation of the bets, an occurrence of a violation of the one or more gambling rules by one or both of the first player and the at least one other player.

6. The system of claim 5, wherein the one or more processors are further configured to:

detect completion of the interactive electronic game; and cause the value to be withheld from one or both of the first player and the at least one other player until a resolution.

7. The system of claim 4, wherein the one or more processors are further configured to determine, based on the evaluation of the bets, an absence of an occurrence of a violation of the one or more gambling rules by one or both of the first player and the at least one other player based on the result of the evaluating.

8. The system of claim 7, wherein the one or more processors are further configured to:

detect completion of the interactive electronic game; and cause the value to be awarded to one or both of the first player and the at least one other player.

9. The system of claim 1, wherein the one or more processors are further configured to cause the communications interface to establish communications with the first player terminal and the at least a second player terminal.

10. The system of claim 9, wherein to cause the communications interface to establish communication, the one or more processors are further configured to cause the communications interface to establish communication with the first player terminal and the at least a second player terminal via the Internet.

11. The system of claim 1 further comprising at least one of:

the first player terminal; and the at least a second player terminal.

12. The system of claim 11, wherein the at least one of the first player terminal and the at least a second player terminal are configured to employ electronic countermeasures that disrupt cell phone signals.

13. The system of claim 11, wherein the at least one of the first player terminal and the at least a second player terminal are configured to engage one or both of the first player and the at least one other player in the interactive gaming session anonymously.

14. The system of claim 11 further comprising at least one of:

the display device of the first player terminal; and the display device of the at least a second player terminal.

15. The system of claim 11, wherein the host computer is positioned remotely from the at least one of the first player terminal and the at least a second player terminal.

16. The system of claim 1, wherein the first player participates in the interactive electronic game using the first player terminal from a location that is different from a location from which the at least one other player participates in the interactive electronic game using the at least a second player terminal.

17. The system of claim 1, wherein the first player participates in the interactive electronic game using the first player terminal at a location that is the same as a location from which the at least one other player participates in the interactive electronic game using the at least a second player terminal.

18. The system of claim 1, wherein the interactive electronic game is poker, blackjack, or bridge.

19. A method for operating a host computer system for networked interactive gaming, the method comprising:

initiating an interactive gaming session of an interactive electronic game hosted by the host computer system;

causing action from the interactive electronic game to be displayed to: a first player on a display device of a first player terminal, and at least one other player on a display device of at least a second player terminal;

monitoring: a player interaction area of the first player terminal, and a player interaction area of the at least a second player terminal, for interactions from the first, and the at least one other, players to control gaming action of the interactive electronic game;

causing, during the interactive electronic game, interactive content displayed in the player interaction areas of the first, and the at least a second, player terminals to be changed based on a state of the interactive electronic game created by the gaming action;

in response to the gaming action,
evaluating the interactions received via the player interaction areas of the first, and the at least a second, player terminals in view of one or more gaming rules for the interaction gaming session;
determining an occurrence of a violation of the one or more gaming rules by the first player based on a result of the evaluating; and
in response to determining the occurrence of the violation of the one or more gaming rules by the first player, barring the first player from participating in the interactive gaming session using the first player terminal.

20. The method of claim 19, wherein the evaluating step comprises evaluating a frequency of common play between the first, and the at least one other, players in the interactive electronic game in view of the one or more gaming rules for the interactive gaming session.

21. The method of claim 19 further comprising determining an occurrence of a violation of the one or more gaming rules by the at least one other player based on the result of the evaluating.

22. The method of claim 21 further comprising barring the at least one other player from participating in the interactive gaming session using the at least a second player terminal in response to determining the occurrence of the violation of the one or more gaming rules.

23. The method of claim 19, wherein the one or more gaming rules include one or more gambling rules for the interactive gaming session, and wherein the method further comprises monitoring the player terminals of the first, and the at least a second, player terminals for a bet having a value.

24. The method of claim 23, wherein the evaluating step comprises evaluating bets received via the player interaction areas of the first, and the at least a second, player terminals in view of the one or more gambling rules for the interactive gaming session.

25. The method of claim 24, wherein the determining step comprises determining an occurrence of a violation of the one or more gambling rules by the first player based on the result of the evaluating.

26. The method of claim 25 further comprising:
detecting completion of the interactive electronic game; and
causing the value to be withheld from the first player until a resolution.

27. The method of claim 24 further comprising determining an absence of an occurrence of a violation of the one or more gaming rules by the at least one other player based on the result of the evaluating.

28. The method of claim 27 further comprising:
detecting completion of the interactive electronic game; and
causing the value to be awarded to the at least one other player.

29. A host computer system for networked interactive electronic gaming across one or more gaming locations, the host computer system comprising:
at least one communications interface; and
at least one server computing device game operably coupled to the communications interface, and including one or more processors configured to:
direct the communications interface to establish communication via at least one local server of the one or more gaming locations with:
a first player terminal operable by a first player at the one or more gaming locations; and
at least a second player terminal operable by at least one other player at the one or more gaming locations;
initiate an interactive gaming session for an interactive electronic game;
cause action from the interactive electronic game to be viewable by the first, and the at least one other, players via the first, and the at least a second, player terminals, respectively;
monitor, via the communications interface:
a player interaction area of the first player terminal for interactions from the first player to control gaming action of the interactive electronic game; and
a player interaction area of the at least a second player terminal for interactions from the at least one other player to control gaming action of the interactive electronic game;
cause, via the communications interface and during the interactive game, interactive content displayed in the player interaction areas of the first, and the at least a second, player terminals to be changed based on a state of the interactive electronic game created by the gaming action;
in response to the gaming action:
evaluate the interactions received via the player interaction areas of the first, and the at least a second, player terminals in view of one or more gaming rules for the interactive gaming session;
determine an occurrence of a violation of the one or more gaming rules by the one or both of the first player and the at least one other player based on a result of the interactions being evaluated; and
in response to the occurrence of the violation being determined,
cause, via the communications interface, one or both of the first player and the at least one other player to be barred from participating in the interactive gaming session using a respective player terminal of at least one of the first, and the at least a second, player terminals.

30. One or more non-transitory computer readable media having instructions stored thereon which, when executed by one or more processors, cause a machine to:
initiate an interactive gaming session of an interactive electronic game;
cause action from the interactive electronic game to be displayed on:
a display device of a first player terminal operable by a first player; and
at least one other display device of at least a second player operable by at least one other player;
monitor:
a player interaction area of the first player terminal for interactions from the first player to control gaming action of the interactive electronic game; and
a player interaction area of the at least a second player terminal for interactions from the at least one other player to control gaming action of the interactive electronic game;
cause, during the interactive electronic game, interactive content displayed in the player interaction areas of the first, and the at least a second, player terminals to be changed based on a state of the interactive electronic game created by the gaming action;
in response to the gaming action,
evaluate the interactions received via the player interaction areas of the first, and the at least a second, player terminals in view of one or more gaming rules for the interactive gaming session;

determine an occurrence of a violation of the one or more gaming rules by one or both of the first player and the at least one other player based on a result of the interactions being evaluated; and in response to the occurrence of the violation being determined, cause one or both of the first player and the at least a second player to be barred from participating in the interactive gaming session using a respective player terminal of at least one of the first, and the at least a second, player terminals.

* * * * *